United States Patent [19]
Kikuchi et al.

[11] Patent Number: 5,739,993
[45] Date of Patent: Apr. 14, 1998

[54] SHUTTER FOR DISK CARTRIDGE INCLUDING INTEGRALLY FORMED DISPLAY SURFACE

[75] Inventors: Shuichi Kikuchi; Yoshinori Miura; Yuji Iwaki, all of Miyagi, Japan

[73] Assignee: Sony Corporation, Tokyo, Japan

[21] Appl. No.: 714,662

[22] Filed: Sep. 16, 1996

[30] Foreign Application Priority Data

Sep. 18, 1995 [JP] Japan .................... 7-238251

[51] Int. Cl.$^6$ .................................... G11B 23/03
[52] U.S. Cl. ........................................... 360/133
[58] Field of Search ................................. 360/133

[56] References Cited

U.S. PATENT DOCUMENTS 4,725,111  2/1988  Weitzen .................... 350/3.85

FOREIGN PATENT DOCUMENTS

0239996 A2  10/1987  European Pat. Off. ...... G11B 23/033
0271997 A2  6/1988   European Pat. Off. ...... G11B 23/03

*Primary Examiner*—A. J. Heinz
*Attorney, Agent, or Firm*—Limbach & Limbach L.L.P.

[57] ABSTRACT

A disk cartridge for data storage or the like includes a cartridge casing having a disk formed as a data storage medium rotatably mounted therein. The cartridge casing includes an opening defined therethrough for allowing access to the rotatable disk. A substantially U-shaped metallic shutter is slidably disposed on the cartridge casing to as to cover and uncover the access opening according to sliding movement thereof. The metallic shutter is formed by bending processing of a metallic plate material, such as aluminium to form a substantially U-shaped shutter body having a display surface portion defined on an outer side thereof. The display portion is formed by pressing and deforming a selected area of the outer side of the shutter body and forming thereon a matt display area having a surface roughness greater than other surface portions of the shutter body. The surface roughness of the display may be established having a surface roughness equal to or greater than 5 with a thickness thereof being equal to or less than 30% of the general thickness of the shutter body. Also, the display surface area may be formed as a design, logo, character or the like.

11 Claims, 7 Drawing Sheets

SHUTTER FOR DISK CARTRIDGE INCLUDING INTEGRALLY FORMED DISPLAY SURFACE

BACKGROUND OF THE INVENTION

1. Field of the Invention

The present invention relates to a metallic shutter for a disk cartridge. Specifically, the present invention relates to a disk cartridge having a slidably mounted shutter which includes an integrally formed display surface on an outer side thereof.

2. Description of the Related Art

Generally, data disk cartridges such as a 3.5 inch floppy disk, for example (hereinbelow simply referred to as: disk cartridge), include a sliding metallic shutter mounted on an edge portion thereof. The shutter is moveable so as to open and close an opening in the cartridge casing for allowing access to the disk. As may be seen in FIG. 10, a conventional disk cartridge 101 includes a rotatable disk 102, generally formed of a magnetic data storage medium, or the like, a shell, or cartridge casing 103 within which the disk 102 is rotatably mounted, and a head insertion opening 104 for allowing a read and/or write head of a data storage device to gain access to the disk 102.

Figure 10:
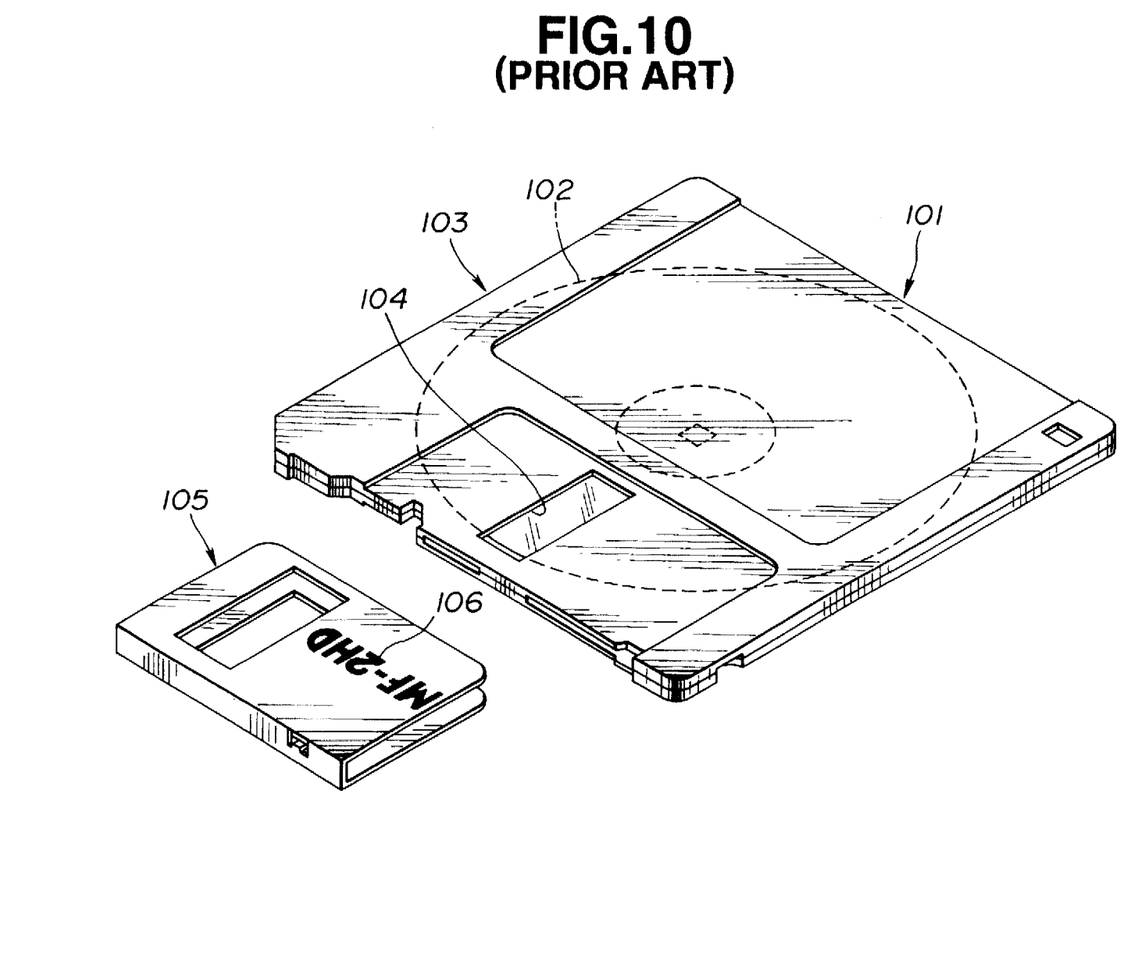
FIG. 10 is a perspective view of a conventional disk cartridge and shutter arrangement.

For protecting the disk 102, a substantially U-shaped metallic shutter 105, formed of aluminium alloy, or the like, is mounted on an outer edge portion of the cartridge casing. The shutter 105 is slidably mounted such that sliding movement thereof is allowed for covering and uncovering the head insertion opening 104 according to operation of a disk drive or other data storage device.

It is common for at least one outer side of the shutter 105 to be utilized as a display surface for displaying a logo, mark, product information or the name of the manufacturer, etc.

Generally such a display mark is formed by applying silk screen printing processing to a base material (i.e. a metallic sheet material) before carrying out punching and bending processing and the like for forming the finished shutter. Alternatively, a UV printing process is applied to the shutter after fabrication thereof. The display mark is then subject to curing processing with UV (ultra violet light) equipment for curing and fixing the display.

However, forming display portions on the shutter surface according to the above methods raises various drawbacks. That is, in order to produce a display mark according to the above methods, printing apparatus and/or UV curing apparatus are required. Further, the number of processing steps for providing the display mark increase the overall processing time and expense for fabricating the shutter.

In addition, if a display mark is to be provided on a metallic surface according to conventional printing methods, the surface must first be cleaned. Such a cleaning step further increases the time and expense of production. Moreover, generally such cleaning is carried out by using an organic solvent such as trichloroethylene or the like. Such solvents are chemicals which must be carefully handled and stored and more importantly, waste by products resulting from the use of such chemicals are harmful to the environment and thus, it is desirable to minimize their usage.

Thus it has been required to provide a disk cartridge shutter which may be simply manufactured at low cost which may include a display portion integrally formed thereon.

SUMMARY OF THE INVENTION

Thus, it is an object of the present invention to overcome the drawbacks of the related art and to provide a disk cartridge shutter which may be produced with a lower number of processing steps without the use of harmful chemicals while still providing a suitable display mark which is easily visible on the shutter surface.

It is a further object of the invention to provide a disk cartridge shutter which may include a display portion integrally formed thereon and a method by which such a shutter may be simply manufactured at low cost.

It is also an object of the invention to provide a data disk cartridge having a slidably mounted metallic shutter Which includes a display area integrally formed thereon.

According to one aspect of the invention, there is provided a shutter for a disk cartridge, comprising a shutter body formed of a metallic plate material, an outer side of the shutter body having a display surface portion formed thereon, wherein the display surface portion is defined by pressing and deforming a predetermined portion of the outer side for forming a matt display area having a surface roughness greater than other outer surface portions of the shutter body. According to a further aspect of the invention there is provided a disk cartridge for data storage, comprising a cartridge casing having a hollow space defined between opposing sides thereof, at least one portion of the cartridge casing including an opening defined therethrough allowing access to the hollow space. A disk formed so as to be utilized as a data storage medium is rotatably mounted in the hollow space defined in the cartridge casing and a metallic shutter body is slidably mounted on an outer surface of the cartridge casing allowing the opening defined through the one portion of the cartridge casing to be covered and uncovered according to sliding movement of the shutter body. An outer side of the shutter body is formed with a display surface portion thereon defined by pressing and deforming a predetermined portion of the outer side for forming a matt display area having a surface roughness greater than other outer surface portions of the shutter body.

DESCRIPTION OF THE PREFERRED EMBODIMENT

Hereinbelow, a preferred embodiment of the invention will be explained in detail with reference to FIGS. 1–9.

Figure 1:
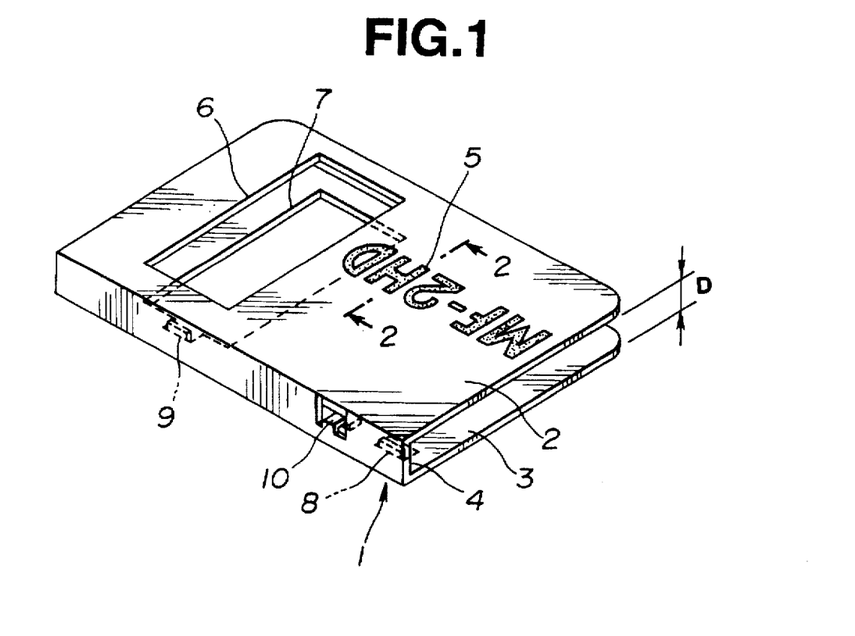
FIG. 1 is a perspective view of a preferred embodiment of a disk cartridge shutter according to the invention.

Referring now to FIG. 1, a shutter 1 according to the present embodiment may be formed of an aluminium alloy having a thickness of 0.15 mm to 0.3 mm, although other thicknesses may also be utilized. The shutter 1 is formed by bending processing so as to be substantially U-shaped. The components of the shutter 1 include opposed side cover portions 2 and 3, which are generally rectangular or square.

The cover portions 2 and 3 are disposed parallel to each other separated by a gap D having a predetermined dimension. The opposed cover portions 2 and 3 are supported by a spine 4 disposed along a common edge of both of the cover portions 2, 3. The width of the spine 4 is established to assure separation of the cover portions 2 and 3 with the desired gap D.

The above described components are integrally formed of a single piece of metallic plate material according to bending and punch processing and the like. Also, according to the present embodiment, disk access openings 6 and 7 are formed in alignment with each other at one side of each of the cover portions 2 and 3.

In addition, the shutter 1 further includes first and second slide guide members 8 and 9, cut and raised in the lower cover portion 3, for example. Also, a spring fastening portion 10 is also formed in the spine by punching and bending processing, or the like.

In FIG. 1, a display surface 5 is shown on an outer side of the upper cover portion 2 although the outer surface of any of the components of the shutter may be utilized as a display surface. The present invention utilizes the phenomenon of variations in the reflection of light from an irregular surface to create the display mark at the display surface portion 5.

Figure 2:
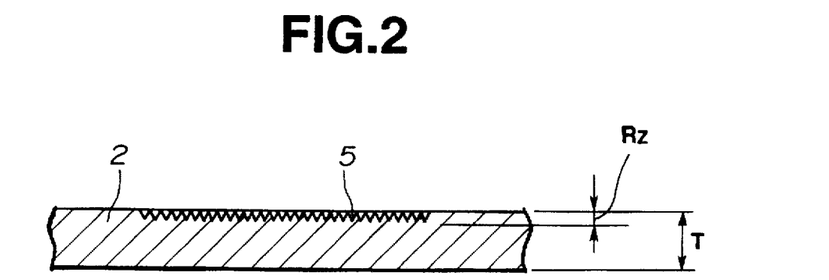
FIG. 2 is a cross-sectional view of the shutter of the invention taken along line 2—2 of FIG. 1.

As shown in FIG. 2, the display surface portion 5 is formed as an irregular pattern having a predetermined surface roughness Rz formed on the desired area of the outer surface of the cover portion 2 which has a total thickness T.

Of course, the upper cover portion 2 is utilized as the display surface by way of example only, it will be understood that the display surface portion 5 may also be preferably formed on the cover portion 3 and/or the spine 4.

According to the present embodiment, an average surface roughness of ten points may be applied as the value Rz. Specifically, in the present embodiment a depth of surface roughness equal to or more than the display surface portion 5 is utilized, being equal to or less than 30% of the thickness T of the cover portion 2 (3). That is, if a metallic plate used for fabricating the shutter 1 has a thickness T of 0.2 mm, the display surface portion is formed with a surface roughness equal to or less than 0.2×0.30=0.06 mm (i.e. 60).

It has been found by the inventors that the minimum surface roughness of the display surface portion 5 is required to provide a necessary and desirable visibility of the formed display mark. This minimum roughness however produces a mark which is still somewhat hard to see. For this reason, a minimum depth of surface roughness of 10 is recommended for greater visibility of the display surface area 5. It will also be noted, that processing for forming the surface roughness area Rz may result in a concave portion being produced on the rear side of the metallic plate as a result of processing if the depth of the surface roughness is too great (i.e. greater than 30% of T).

Thus, an optimum display mark according to the invention, in terms of enhancing visibility while minimizing deformation of the base material, is recommended to be equal to or greater than 10 while being limited to equal to or less than 20% of the total thickness T of the metallic plate.

Hereinbelow, a fabrication method of the shutter 1 according to the invention will be explained in detail with reference to FIGS. 3–8.

Figure 3:
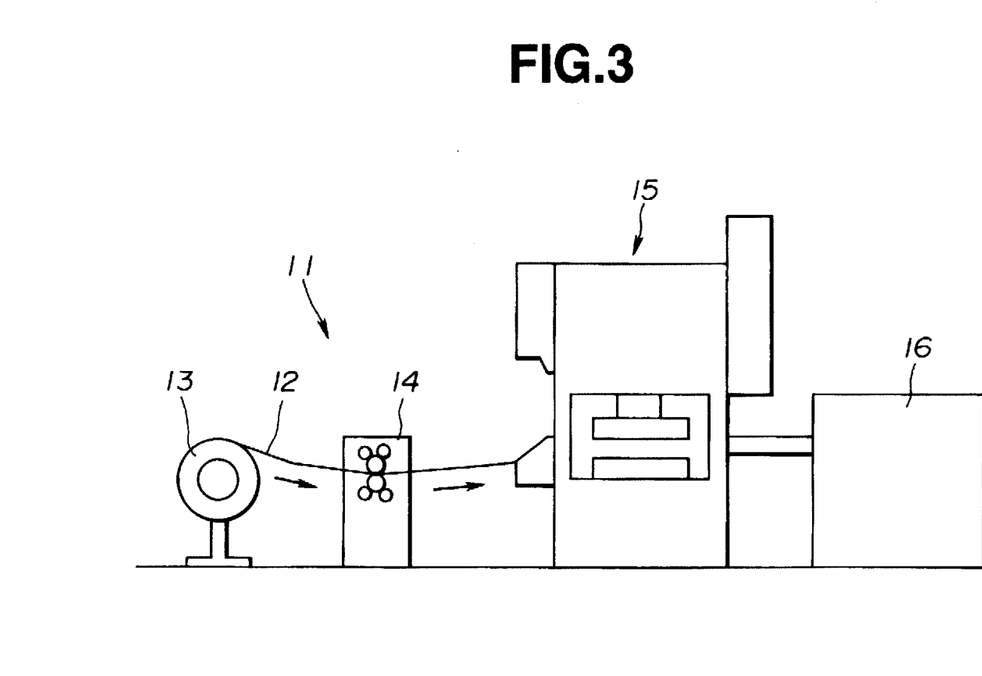
FIG. 3 shows a schematic side view of an apparatus utilized for fabricating disk cartridge shutters.

Referring now to FIG. 3, a fabricating apparatus 11 is utilized for forming the shutter 1 of the invention. Processing for the shutter 1 includes a plate blanking process, a display surface forming process, a bending process and a cutting process.

The fabricating apparatus 11 includes a plate material feeding device 13 for feeding a raw material. According to the invention, the raw material is a sheet of metallic plate material 12 (i.e. aluminium alloy, stainless steel, etc.). The roll of metallic plate material 12 is fed to a correcting device 14 for preventing bending of the metallic plate material 12 during processing and maintaining a flat condition thereof.

A forming device 15 carries out plate blanking and bending processing and then the processed metallic plate material 12 is fed to an arranging device 16 for arranging and feeding the shutters 1, 1, . . . formed at the forming device 15. The forming device 15 comprises a blanking processing press mechanism, a display surface press forming mechanism, a bending mechanism and a cutting mechanism, as will be explained in detail hereinbelow.

Figure 4:
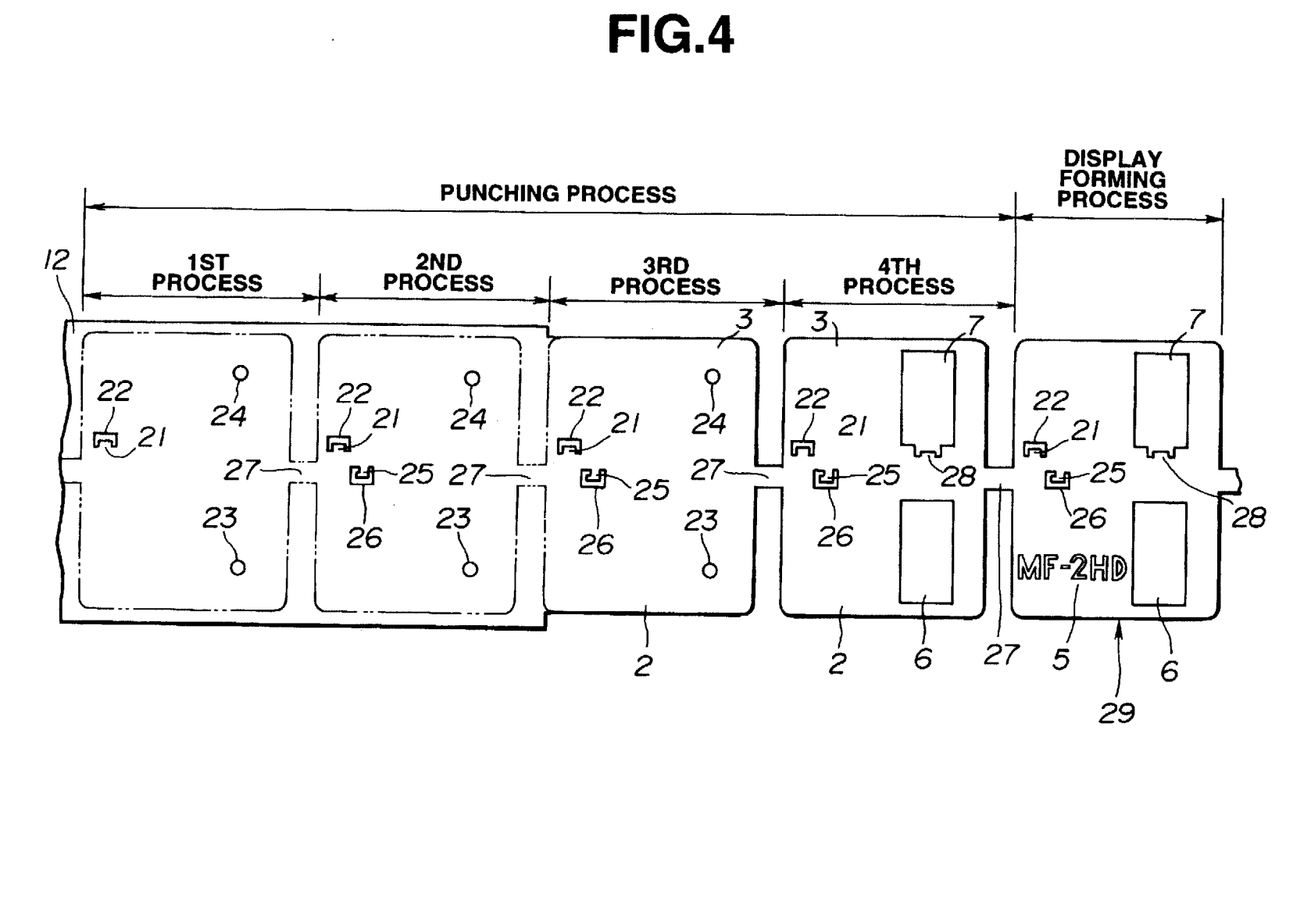
FIG. 4 is a top view of a shutter forming process showing a plurality processing steps effected on a metallic plate base material including punching processing and display surface portion forming steps utilized in forming a shutter according to the invention.

Referring now to FIG. 4, it may be seen that the blanking process includes four different procedures. In a first processing step, a first notch portion 22 for forming a first notch piece 21 is blanked from the metallic plate material 12 to be later formed into the first slide member 8. Also first and second circular pilot holes 23 and 24 are punched for later forming of the access openings 6 and 7. At the second processing step, a fourth notch portion 26 forming a second tongue piece 25 is blanked in the vicinity of the first notch portion 22 for later being formed into the spring fastening member 10. Then, at a third processing step, a so-called outer blanking process is carried out for defining the shape of the individual plate portions for the cover portions 2 and 3 and the spine 4 for the finished shutters 1, 1, . . . are blanked. At this step, a connecting portion 27 is defined for connecting the plurality of plates defined in the metallic sheet material such than they are connected so as to allow continuous feeding during fabrication. Finally, the fourth processing step is carried out in which the access openings 6 and 7 are blanked and a third tongue piece 28 is defined at one side of the access opening 7 for later forming into the second slide guide member 9.

Figure 5:
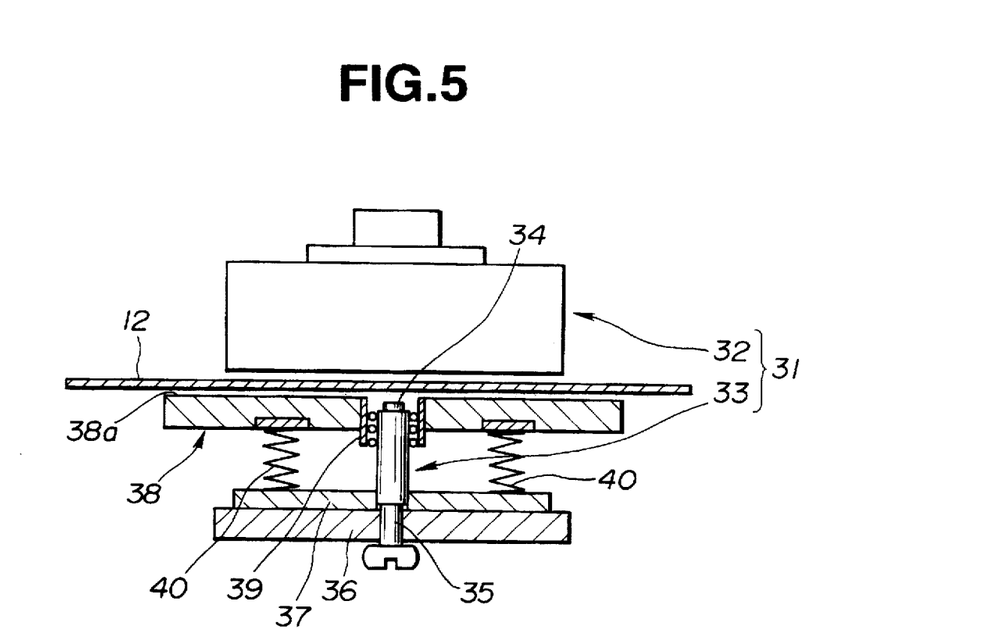
FIG. 5 shows a side view of a pressing apparatus utilized for forming a display surface portion of the disk cartridge shutter wherein a metallic plate material for forming the shutter is inserted for processing.

After this, the display portion forming process is carried out. FIG. 5 shows the press mechanism 31 for forming the display surface portion 5. This comprises an upper punch 32 and a lower (fixing) punch 33. The lower punch includes a marking tip 34 at an upper side thereof where at it may be brought into contact with a lower side of the metallic sheet material 12 for defining the contours of the display surface portion 5. The lower punch is supported on a die holder 36 and die 37 via a height adjusting screw 35. A support table 38 is provided for supporting the metallic sheet material 12 during press processing. The support table 38 has a punch guide 39 defined therethrough supported by springs 40 . . . 40 disposed on the die 37 for raising and lowering the lower punch 33 by engaging a lower portion of the lower punch 33 via the punch guide 39. An upper surface 38a of the support table is set at a position higher than the marking tip 34 to retain the metallic plate material 12 suitably positioned over the marking tip 34.

When the metallic plate material is suitably positioned, the lower punch is raised to close the pressing mechanism 31 thus pressing the marking tip into the lower surface of the metallic sheet material 12. Thus, the surface roughness establishing the display surface portion 5 is formed.

Figure 6:
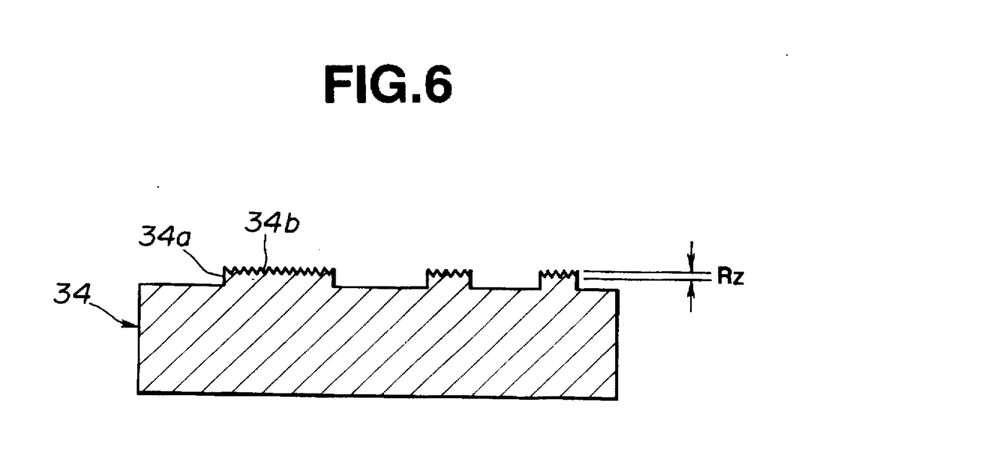
FIG. 6 is an enlarged cross-sectional view of a portion of the disk shutter including detail of a display surface portion formed thereon.

FIG. 6 shows an enlarged view of the end of the marking tip 34. As may be seen, the shape of the display surface portion 5 is defined as a pressing member 34a on the marking tip 34. This pressing member has an upper surface 34b having a roughness value Rz equal to that desired for the display surface marking portion (i.e. 5). The surface roughness Rz of the upper surface 34b is thus impressed into the metallic plate material 12 and the display surface portion 5 is formed.

Figure 7:
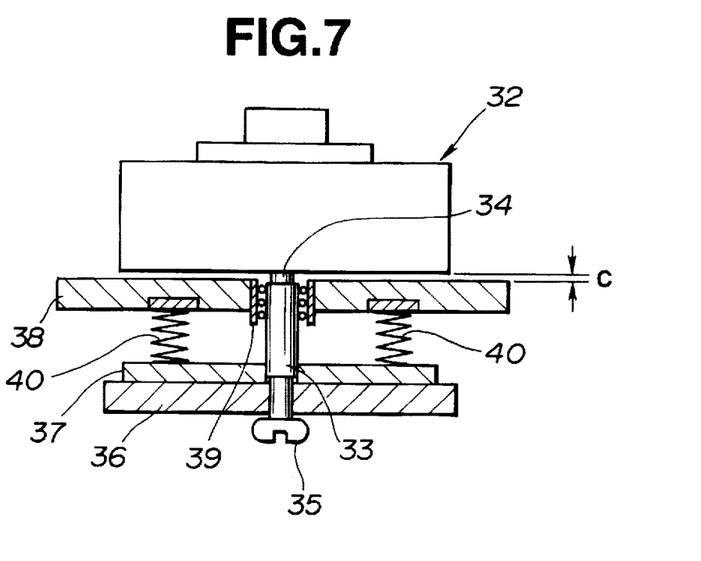
FIG. 7 is a side view of the pressing apparatus for forming a display surface portion of a disk cartridge shutter.

It will be noted from FIG. 7 that an accuracy of impressing the display surface portion 5 is determined according to a clearance C defined between the upper and lower punches 32, 33. This clearance C is established to be 90% of the thickness T of the metallic plate material 12. That is, if the material 12 is 0.2 mm, the clearance, which is between a lower dead point of the raising and lowering upper punch 32 the marking tip 34, is set to be 1.8 mm. Thus shutter configuration plates 29 having all elements of the finished shutter 1 are continuously output.

Figure 8:
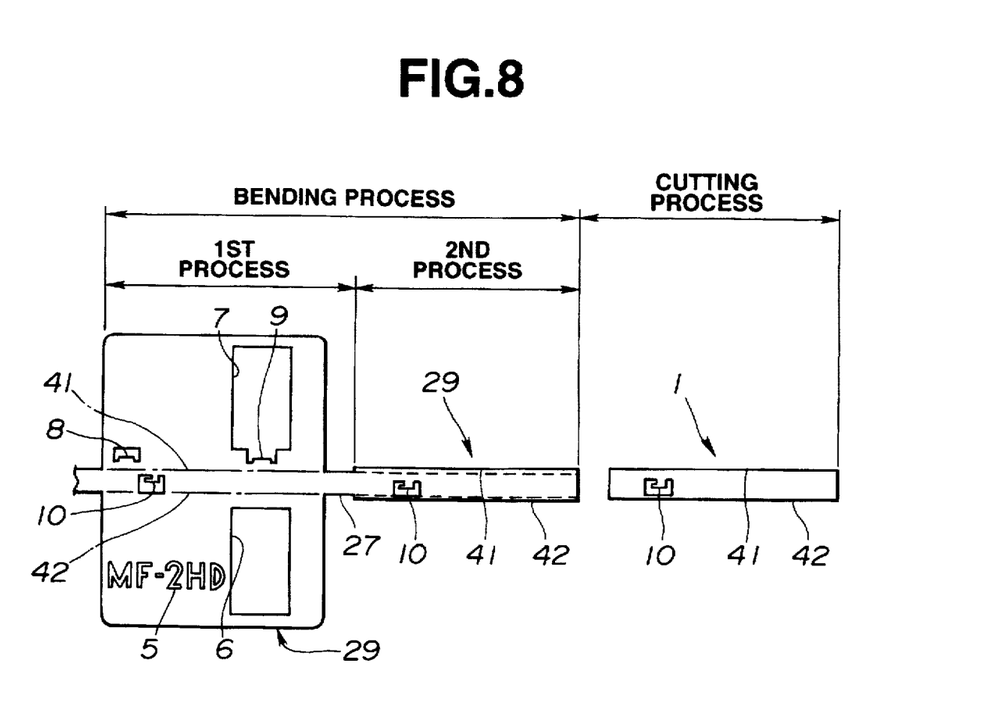
FIG. 8 is a top view showing further processing steps of the shutter forming process according to the invention including bending and cutting processing.

The final steps in forming the finished shutter are shown in FIG. 8. These processing steps comprise first and second bending processing steps and a cutting process.

First, the tongue pieces 21, 25 and 28 are bent and the guide members 8 and 9 and the spring fastening member 10 are formed. Then the configuration plate 29 is bent into a U-shaped configuration at bending portions 41 and 42. The connecting portion 27 are then cut away and individual shutters 1 are formed.

Figure 9:
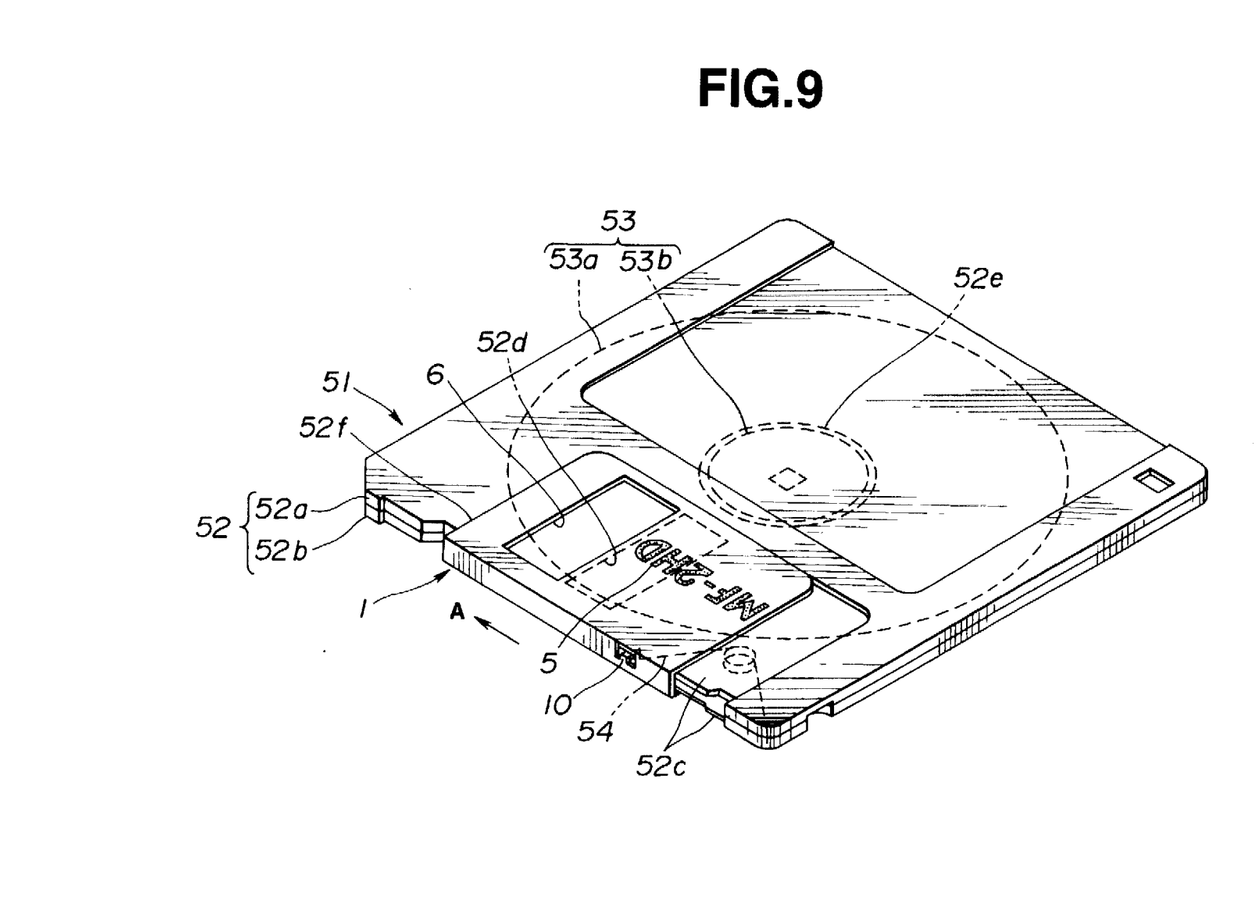
FIG. 9 is a perspective view of a disk cartridge utilizing a slidably mounted metallic shutter according to the invention.

FIG. 9 shows an example of a disk cartridge 51 utilizing the shutter 1 of the invention. The disk cartridge 51 comprises a shell, or cartridge casing 52 having a head insertion opening 52d formed therethrough. A disk 53 is rotatably accommodated in the casing 52 and the shutter 1 is slidably mounted on an edge portion of the casing 52 via the slide guide members 8 and 9 and the spring fastening piece retains a spring 54 to bias the slidable shutter 1 in a direction so as to cover the head insertion opening 52d. The casing 52 may comprise upper and lower shells 52a, 52b with recessed portions 52c defined for accommodating the cover portions 2 and 3 when installed. The disk 53 includes and outer circumference 53a and an inner circular center opening 53b in which a metallic hub 52e is installed for suitably mounting the disk 53 within the casing 52.

Thus, according to the present invention as described herein above, there is provided a disk cartridge and metallic shutter therefor which may be simply and inexpensively produced and which includes a display surface integrally formed on the outer side of the shutter.

According to the invention as set forth in the above description, printing apparatus and/or UV curing apparatus are not required and the number of processing steps for fabricating the shutter are significantly reduced and may be accomplished with fewer varieties of machinery.

In addition, use of chemical solvents such as trichloroethylene and the like is not required. This not only further reduces costs and simplifies manufacture but, there is no need for dangerous chemicals to be handled or stored by workers and of course, no environmentally harmful waste products are produced.

Further, according to the structure of the invention as herein set forth, a marking or information provided on the display surface area will not become worn or detached from the shutter. Thus the durability of the display is assured and important markings or information will not be accidentally rubbed off or removed from the disk cartridge.

Although the preferred embodiment is set forth in terms of a data disk cartridge such as a 3.5 inch floppy disk, it will be noted that various types of disk cartridges are in current use which utilize a structure which includes such a sliding metallic shutter mounted on the outer side of a cartridge casing. The present invention may be utilized for many of such different types of disk cartridges and may be embodied in various different ways without departing from the principle of the invention as herein set forth.

The present invention in not limited only to the description as herein disclosed but may be modified and embodied in other ways without departing from the scope or inventive concept of the invention as set forth above.

What is claimed is:

1. A shutter for a disk cartridge, comprising:
   a shutter body formed of a metallic plate material;
   an outer side of said shutter body having a display surface portion formed thereon; wherein
   said display surface portion is defined by pressing and deforming a predetermined portion of said outer side for forming a matt display area having a surface roughness greater than other outer surface portions of said shutter body.

2. A shutter for a disk cartridge as set forth in claim 1, wherein said display surface portion is formed with a depth of surface roughness equal to or greater than 5, or equal to or less than 30% of a thickness of said shutter body.

3. A shutter for a disk cartridge as set forth in claim 1, wherein said shutter body is formed of an aluminium alloy.

4. A shutter for a disk cartridge as set forth in claim 1, wherein said shutter body is formed by bending processing of said metallic plate material to form said shutter body with a substantially U-shaped configuration.

5. A shutter for a disk cartridge as set forth in claim 1, wherein said matt display area may be shaped as a design, logo, character or the like.

6. A disk cartridge for data storage, comprising:
   a cartridge casing having a hollow space defined between opposing sides thereof, at least one portion of said cartridge casing including an opening defined therethrough allowing access to said hollow space;
   a disk formed so as to be utilized as a data storage medium rotatably mounted in said .hollow space defined in said cartridge casing;
   a metallic shutter body slidably mounted on an outer surface of said cartridge casing allowing said opening defined through said one portion of said cartridge casing to be covered and uncovered according to sliding movement of said shutter body;
   an outer side of said shutter body having a display surface portion formed thereon defined by pressing and deforming a predetermined portion of said outer side for forming a matt display area having a surface roughness greater than other outer surface portions of said shutter body.

7. A disk cartridge as set forth in claim 6, wherein said display surface portion is formed with a surface roughness equal to or greater than 5.

8. A disk cartridge as set forth in claim 7, wherein a thickness of said display surface portion is determined to be equal to or less than 30% of a thickness of said shutter body.

9. A disk cartridge as set forth in claim 6, wherein said shutter body is formed by bending processing of a metallic plate material so as to have a substantially U-shaped configuration, said U-shaped shutter body being slidably mounted on an edge portion of said cartridge casing.

10. A disk cartridge as set forth in claim 6, wherein said shutter body is formed of an aluminium alloy.

11. A disk cartridge as set forth in claim 6, wherein said matt display area may be formed to be shaped as a design, logo, character or the like.

* * * * *

UNITED STATES PATENT AND TRADEMARK OFFICE
CERTIFICATE OF CORRECTION

PATENT NO.: 5,739,993
DATED: April 14, 1998
INVENTOR(S): SHUICHI KIKUCHI ET AL.

It is certified that error appears in the above-identified patent and that said Letters Patent is hereby corrected as shown below:

Col. 6, line 58, replace ".hollow" with --hollow--.

Signed and Sealed this

Eleventh Day of August 1998

Attest:

BRUCE LEHMAN

Attesting Officer

Commissioner of Patents and Trademarks